US009743680B2

(12) United States Patent
Chanamai

(10) Patent No.: US 9,743,680 B2
(45) Date of Patent: Aug. 29, 2017

(54) MICROEMULSIONS FOR USE IN FOOD AND BEVERAGE PRODUCTS

(75) Inventor: Ratjika Chanamai, Crescent Springs, KY (US)

(73) Assignee: WILD Flavors, Inc., Erlanger, KY (US)

( * ) Notice: Subject to any disclaimer, the term of this patent is extended or adjusted under 35 U.S.C. 154(b) by 1702 days.

(21) Appl. No.: 11/539,391

(22) Filed: Oct. 6, 2006

(65) Prior Publication Data

US 2007/0087104 A1    Apr. 19, 2007

Related U.S. Application Data

(60) Provisional application No. 60/727,122, filed on Oct. 14, 2005.

(51) Int. Cl.
*A23D 7/00* (2006.01)

(52) U.S. Cl.
CPC .................................. *A23D 7/003* (2013.01)

(58) Field of Classification Search
None
See application file for complete search history.

(56) References Cited

U.S. PATENT DOCUMENTS

| | | | |
|---|---|---|---|
| 4,146,499 A | 3/1979 | Rosano | |
| 4,379,755 A | 4/1983 | Yamada et al. | |
| 4,391,876 A | 7/1983 | Tamosauskas et al. | |
| 4,752,481 A | 6/1988 | Dokuzovic | |
| 4,835,002 A | 5/1989 | Wolf et al. | |
| 5,320,863 A | 6/1994 | Chung et al. | |
| 5,376,397 A * | 12/1994 | Gaonkar | 426/602 |
| 5,447,729 A | 9/1995 | Belenduik et al. | |
| 5,948,825 A | 9/1999 | Takahashi et al. | |
| 6,048,566 A | 4/2000 | Behram et al. | |
| 6,054,136 A | 4/2000 | Farah et al. | |
| 6,068,876 A * | 5/2000 | Miller et al. | 426/604 |
| 6,077,559 A | 6/2000 | Logan et al. | |
| 6,146,672 A | 11/2000 | Gonzalez et al. | |
| 6,251,441 B1 | 6/2001 | Van Den Braak et al. | |
| 6,274,574 B1 * | 8/2001 | Akashe et al. | 514/182 |
| 6,303,662 B1 | 10/2001 | Nagahama et al. | |
| 6,376,482 B2 | 4/2002 | Akashe et al. | |
| 6,426,078 B1 | 7/2002 | Baver et al. | |
| 6,444,253 B1 | 9/2002 | Conklin et al. | |
| 6,509,044 B2 | 1/2003 | Van Den Braak et al. | |
| 6,528,070 B1 | 3/2003 | Bratescu et al. | |
| 6,774,247 B2 | 8/2004 | Behram | |
| 2002/0119173 A1 * | 8/2002 | Lin et al. | 424/401 |
| 2002/0155084 A1 * | 10/2002 | Roessler et al. | 424/70.21 |
| 2002/0187238 A1 | 12/2002 | Vlad | |
| 2003/0087967 A1 | 5/2003 | Quemin | |
| 2003/0220406 A1 * | 11/2003 | Corbella et al. | 514/784 |
| 2004/0115159 A1 | 6/2004 | Tadlock et al. | |
| 2006/0240156 A1 * | 10/2006 | Panarisi et al. | 426/120 |

FOREIGN PATENT DOCUMENTS

| | | | |
|---|---|---|---|
| JP | H 01-155941 | 6/1989 | |
| JP | A 1997-110635 | 4/1997 | |
| JP | 2001/200069 | 7/2001 | |
| JP | 2002-348589 A | 12/2002 | |
| WO | WO9406310 | 3/1994 | |
| WO | WO 94/08605 * | 4/1994 | ............ A61K 37/00 |
| WO | WO 03/063826 | 8/2003 | |
| WO | WO 2007/047237 | 4/2007 | |

OTHER PUBLICATIONS

Jean-Louis Salager "Surfactants Types and Uses" Universidad De Los Andes FIRP Booklet # E300-A 2002 pp. 1-50.*
Rosano, H. "Microemulsions." J. Soc. Cosmetic Chem. 25:609-619, 1974.
International Search Report dated Mar. 1, 2007 for Application No. PCT/US2006/039483.
Written Opinion dated Mar. 1, 2007 for Application No. PCT/US2006/039483.
Abitec, "food, flavor & nutrition: Harmonizing nature's chemistry by design," ABF Ingredients Co., date unknown, 7 pgs.
Anton, N., et al., "Nano-emulsions and Micro-emulsions: Clarification of the Critical Differences," Pharm Res 2011, 28:978-985.
Caballero, B., et al., Eds., *Encyclopedia of Food Sciences and Nutrition*, 2003, pp. 2080-2086, $2^{nd}$ Ed., London: Academic, 85 pgs.
Kirk-Othmer, *Encyclopedia of Chemical Technology*, Jan. 3, 1980, pp. 910-915, $3^{rd}$ Ed., vol. 8, Wiley-Interscience, 8 pgs.
Lv, G., et al., "Characterization of the addition of lipophilic Span 80 to the hydrophilic Tween 80-stabilized emulsions," Colloids and Surfaces A: Physicochem. Eng. Aspects, 2014, 447:8-13.
McClements, D.J., "Nanoemulsions versus microemulsions: terminology, differences, and similarities," Soft Matter, 2012, 8:1719-1729.
Mehta, S.K., et al., "Analysis of Tween based microemulsion in the presence of TB drug rifampicin," Colloids and Surfaces B: Biointerfaces, 2007, 60:95-104.
Mollet, Dr. H., et al., *Formulation Technology: Emulsions, Suspensions, Solid Forms*, Wiley-VCH, Verlag GmbH, Weinheim, Germany, 2001, pp. 85-87.

(Continued)

Primary Examiner — Felicia Turner
(74) Attorney, Agent, or Firm — Andrew F. Nilles

(57) ABSTRACT

Oil-in-water microemulsions which can be used to incorporate lipophilic water-insoluble materials, such as beta-carotene, into food and beverage compositions are disclosed. The microemulsions utilize a ternary food grade emulsifier system which incorporates a low HLB emulsifier, a medium HLB emulsifier, and a high HLB emulsifier. The microemulsions of the present invention allow for the incorporating of water-insoluble materials in an effective and easy-to-process manner while providing formulational flexibility and without significantly affecting the taste of the underlying food or beverage product. Food and beverage products including the microemulsions are also disclosed. Finally, the method of preparing the microemulsions is described. The invention also encompasses water-in-oil microemulsions for use in incorporating water-soluble materials into food and beverage products. Finally, the invention encompasses concentrate compositions used for making those microemulsions.

20 Claims, No Drawings

(56) References Cited

OTHER PUBLICATIONS

Rosen, M.J., *Surfactants and Interfacial Phenomena*, 2004, $3^{rd}$ Ed., pp. 242-245, J. Wiley & Sons, Hoboken, NJ, 15 pg.
English translation of Abstract for Japanese Application No. JP H 01-155941.
English translation of Abstract for Japanese Application No. JP A 1997-100635.
European Opposition dated Oct. 8, 2012 by Chr. Hansen A/S for Application No. 06825672.
European Opposition dated Oct. 8, 2012 by Sensient Food Colors Germany GmbH for Application No. 06825672.
The HLB System a time-saving guide to emulsifier selection. ICI Americas Inc., Wilmington, DE, 1980.
Shachman, M., *The Soft Drinks Companion: A Technical Handbook for the Beverage Industry*, 2005, CRC Press, Boca Raton, Fla, 11 pgs.
Solans, C., et al., "Nano-emulsions," Current Opinion in Colloid & Interface Science, 2005, 10:102-110.
Van Os, N.M., Ed., *Nonionic Surfactants: Organic Chemistry*, Marcel Dekker, 1998.
Yannai, S., Ed., *Dictionary of Food Compounds with CD-Rom*, Boca Raton, Fla., CRC Press, 2013, 4 pgs.

\* cited by examiner

MICROEMULSIONS FOR USE IN FOOD AND BEVERAGE PRODUCTS

CROSS-REFERENCE TO RELATED APPLICATION

The present application relates to and claims priority from U.S. Provisional Application No. 60/727,122, filed Oct. 14, 2005, incorporated herein by reference.

TECHNICAL FIELD

The present application relates to microemulsions which are effective for incorporating water-insoluble components into aqueous-based food and beverage compositions or water-soluble components into lipid-based food compositions.

BACKGROUND OF THE INVENTION

The formulation of food and beverage products, particularly aqueous-based food and beverage products, can be difficult. For example, it is frequently necessary to incorporate water immiscible components, such as colors, flavors, nutrients, nutraceuticals, therapeutic agents, or antioxidants, into compositions which are primarily aqueous based. The difficulty of this task is increased by the fact that the compositions need to be formulated such that they are esthetically pleasing to the consumer. For example, it is frequently necessary to incorporate a water-insoluble material into an aqueous beverage while still maintaining the optical clarity of the beverage. These compositions also need to exhibit long-term shelf stability under typical food and beverage shipping, storage and use conditions.

One way that the industry has attempted to satisfy these conflicting requirements is to incorporate the water immiscible materials using microemulsions. A microemulsion is a dispersion of two immiscible liquids (one liquid phase being "dispersed" and the other being "continuous") in which the individual droplets of the dispersed phase have an average radius less than about one-quarter the wavelength of light. Such microemulsions have also been termed "nanoemulsions". Typically, in a microemulsion, the dispersed phase droplets have a radius of less than about 1400 Å, and preferably on the order of about 100 to about 500 Å. The basic theory of microemulsions is more fully described in Rosano, Journal of the Society of Cosmetic Chemists, 25: 609-619 (November, 1974), incorporated herein by reference.

Microemulsions can be difficult to formulate, frequently requiring the use of co-solvents, such as ethanol or propylene glycol. These co-solvents can lead to off-flavors in the final product. Further, the formation of microemulsions frequently requires some rather stressful processing conditions, such as high pressure homogenization, which require specialized equipment and can increase the cost of the final product.

It therefore would be useful to have a procedure for formulating microemulsions, using relatively low levels of food grade emulsifiers, which allow the incorporation of water-immiscible components into aqueous-based food and beverage compositions without requiring the use of such co-solvents and relatively extreme processing conditions.

The prior art describes the formation of microemulsions, as well as the use of microemulsions formed by conventional processes for the incorporation of materials into food and beverage products.

U.S. Pat. No. 4,146,499, Rosano, issued Mar. 27, 1979, describes an oil-in-water microemulsion which utilizes a high/low HLB surfactant mixture for forming the emulsion. The patent does not teach or suggest use of a ternary (high/low/medium HLB) surfactant system in forming the emulsion.

U.S. Pat. No. 4,752,481, Dokuzovic, issued Jun. 21, 1988, describes a flavored chewing gum product which includes a chewing gum base, a sweetener, and a flavor-containing emulsion. The emulsion comprises 19 to 59% of a flavoring oil, 1 to 5% of an emulsifier having an HLB of from about 1.6 to about 7.0, and an alkyl polyol (for example, glycerin or polyethylene glycol).

U.S. Pat. No. 4,835,002, Wolf et al., issued May 30, 1989, describes a microemulsion of an edible essential oil (such as citrus oil) in a water/alcohol matrix. The composition comprises water, the essential oil, alcohol and a surfactant. The surfactant component utilized must include a high HLB surfactant, although a mixture of high HLB and low HLB surfactants can also included. There is no disclosure of a ternary surfactant emulsifier system for use in forming the emulsion.

U.S. Pat. No. 5,320,863, Chung et al, issued Jun. 14, 1994, describes microemulsions used to deliver high concentrations of flavor or fragrance oils. The compositions are said to exhibit high stability even in the absence of lower alcohols. The compositions include a nonionic surfactant (generally not edible or food grade); no discussion of HLB criticality is provided. There is no disclosure or suggestion to combine high, low and medium HLB surfactants into a ternary emulsifying system.

U.S. Pat. No. 5,447,729, Belenduik et al, issued Sep. 5, 1995, describes a particulate pharmaceutical composition wherein a pharmaceutical active material may be incorporated into particles in the form of a microemulsion. The outer layers of the particles have hydrophobic/lipophilic interfaces between them. The disclosed compositions can include polysorbate 80 or glycerol monooleate as an emulsifier. There is no teaching in the patent of a ternary surfactant emulsifier system.

U.S. Pat. No. 5,948,825, Takahashi et al., issued Sep. 7, 1999, describes water-in-oil emulsions of hard-to-absorb pharmaceutical agents for use in topical or oral administration. There is no disclosure or suggestion of a ternary surfactant emulsifier system. The emulsifiers disclosed in the '825 patent can include a mixture of two types of nonionic surfactants, one having an HLB of from 10 to 20, and the other having an HLB from 3 to 7.

U.S. Pat. No. 6,048,566, Behnam et al., issued Apr. 11, 2000, describes a nonalcoholic, clear beverage which incorporates from 10 to 500 mg/l of ubiquinone Q10, together with a polysorbate stabilizer.

U.S. Pat. No. 6,077,559, Logan et al., issued Jun. 20, 2000, relates to flavored vinegars which are based on the inclusion of specifically defined microemulsions. The oil-in-vinegar microemulsions comprise from 20% to 70% vinegar, 5% to 35% ethanol, 0.1% to 5% of a flavor material, and 0.5% to 5% of a surfactant. The surfactants utilized are high HLB surfactants; they can also include a small amount of low HLB (4 to 9) surfactant. There is no disclosure of a ternary surfactant emulsifier system in the '559 patent.

U.S. Pat. No. 6,146,672, Gonzalez et al., issued Nov. 14, 2000, relates to spreadable water-in-oil emulsions which are used as fillings in pastry products, particularly frozen pastries. The fillings are said to exhibit enhanced shelf-life and stability. The described emulsions include a mixture of high and low HLB emulsifiers. Although the '672 patent describes a mixture of high and low HLB surfactants, it does not disclose or suggest the ternary surfactant emulsifier system which is utilized in the present invention. Further, the '672 patent does not teach microemulsions or the use of an emulsion to incorporate water-insoluble materials into food products.

U.S. Pat. No. 6,303,662, Nagahama et al., issued Oct. 16, 2001, describes microemulsions used in the delivery of fat-soluble drugs. The disclosed compositions require a high polarity oil, a low polarity oil, a polyglycerol mono fatty acid ester, and a water-soluble polyhydric alcohol. There is no disclosure of a ternary surfactant emulsifier system.

U.S. Pat. No. 6,376,482, Akashe et al., issued Apr. 23, 2002, describes mesophase-stabilized compositions which incorporate plant sterols as cholesterol-lowering agents. The compositions can include a mixture of a surfactant having an HLB of from 6 to 9, a surfactant having an HLB of from 2 to 6, and a surfactant having an HLB of from 9 to 22. Although this patent does teach a ternary emulsifier system, the product formed is not a microemulsion, but rather a mesophase-stabilized emulsion (the mesophase does not have separate oil and water phases). The disclosed compositions are said to provide mouth feel and texture benefits to food products. The emulsion particles formed in the '482 patent are relatively large (i.e., from about 2 to about 10 μm).

U.S. Pat. No. 6,426,078, Bauer et al., issued Jul. 30, 2002, describes oil-in-water microemulsions which comprise from 10% to 99% of a triglycerol mono fatty acid emulsifier (for example, triglycerol monolaurate, triglycerol monocaproate or triglycerol monocaprylate), 1% to 20% of a lipophilic substance (for example, beta-carotene, vitamin A or vitamin E), and water. These compositions are said to be useful in foods, cosmetics or pharmaceuticals for incorporating non-water-soluble (lipophilic) substances. There is no disclosure of a ternary surfactant emulsifier system for forming the microemulsion.

U.S. Pat. No. 6,444,253, Conklin et al, issued Sep. 3, 2002, describes a microemulsion flavor delivery system in the form of an oil-in-alcohol composition. These compositions require the use of alcohols which generally are not included in typical food or beverage formulations. Further, the '253 patent does not teach or suggest a ternary surfactant emulsifier system.

U.S. Pat. No. 6,509,044, Van Den Braak et al., issued Jan. 21, 2003, describes microemulsions of beta-carotene. These microemulsions are said to be based on an emulsifier system which preferably is a binary surfactant system, but can also be a ternary system (although there are no examples of a ternary system provided). It is taught that the fatty acid profiles of the emulsifiers are matched with the fatty acid profiles of the oily ingredient to be incorporated into the composition. There is no teaching in the '044 patent of a ternary high/low/medium HLB surfactant emulsifier system for use in forming the microemulsion.

U.S. Pat. No. 6,774,247, Behnam, issued Aug. 10, 2004, relates to aqueous ascorbic acid solutions. These solutions are said to contain an excess of an emulsifier having an HLB of from about 9 to about 18, such as polysorbate 80. There is no suggestion in the '247 patent to utilize a ternary surfactant emulsifier system.

U.S. Published Patent Application 2002/0187238, Vlad, published Dec. 12, 2002, relates to clear, stable oil-loaded microemulsions used as flavoring components in clear beverage compositions. These compositions utilize a co-solvent at a co-solvent:surfactant ratio of about 1:1. Further, the surfactant component comprises a mixture of at least two surfactants having an average HLB of from about 9 to about 18, preferably from about 12 to about 15. There is no disclosure in the '238 application of a ternary surfactant emulsifier composition comprising a mixture of low/medium/high HLB surfactants. The microemulsions defined in the '238 application comprise at least 30% oil, 1% to 30% of a surfactant mixture having an HLB of from 9 to 18, less than 20% co-solvent, and at least 35% water.

PCT Published Patent Application WO 94/06310, Ford et al., published Mar. 31, 1994, describes a colorant composition in the form of a microemulsion. Compositions disclosed in the '310 application include beta-carotene, alpha-tocopherol and ascorbic acid. Polysorbates are preferred emulsifiers in the '310 application. There is no teaching of a ternary surfactant emulsifier system in the formation of the microemulsion.

SUMMARY OF THE INVENTION

The present invention relates to microemulsions used to incorporate lipophilic water-insoluble materials into food and beverage compositions, comprising:

(a) an oil phase comprising said water-insoluble material and a low HLB emulsifier having an HLB of from about 1 to about 5;

(b) an aqueous phase; and (c) a food grade emulsifier system comprising:
 (i) an emulsifier having an HLB of from about 9 to about 17; and
 (ii) an emulsifier having an HLB of from about 6 to about 8;

wherein said oil phase is dispersed as particles having an average diameter of less than about 300 nm, within said aqueous phase.

The present invention also encompasses food compositions and beverage compositions which incorporate the microemulsions defined above.

The present invention also relates to a method for preparing the microemulsions defined above, comprising the steps of:

(a) mixing the lipophilic water-insoluble components with the low HLB emulsifier to form the oil phase;

(b) mixing the emulsifier system into the oil phase; and (c) adding the aqueous phase into the product of step (b) and mixing to form the microemulsion.

Finally, the present invention relates to water-in-oil microemulsions using the ternary emulsifier system described herein, and concentrates used for making oil-in-water and water-in-oil microemulsions.

The microemulsions of the present invention provide several advantages over conventional compositions. Specifically, the microemulsions of the present invention can carry effective levels of difficult-to-disperse components, such as carotenoids, in optically transparent beverages. The compositions of the present invention are sufficiently stable under normal soft drink transport and storage conditions. The taste of the food and beverage products of the present invention is very acceptable.

The physical and optical characteristics of the emulsions are controllable by selection of appropriate emulsifiers and the heating temperature used, as well as the order of addition of the components. Importantly, the microemulsions of the present invention form essentially spontaneously under normal stirring, without requiring extreme processing conditions, such as high-pressure homogenization. Finally, the microemulsions of the present invention can demonstrate improved bioavailability of the dispersed elements, such as carotenoids.

With the present invention it is also possible to prepare oil-in-water microemulsions containing omega-3 fatty acids or their esters that are highly susceptible to oxidation (or other acids/esters which are highly susceptible to oxidation). It is observed that such components exhibit higher oxidative stability in microemulsions of the present invention than in conventional emulsions.

All patents and publications listed in the present application are intended to be incorporated by reference herein.

All ratios and proportions described in this application are intended to be "by weight," unless otherwise specified.

DETAILED DESCRIPTION OF THE INVENTION

The present invention provides for microemulsions which are easily formed and which allow for the incorporation of water immiscible components into aqueous-based food and beverage compositions. Similarly, the microemulsions can be used to incorporate water-soluble materials into fat-based products. For example, water-soluble natural colorants, flavors, vitamins, salts or antioxidants can be incorporated into fat-based products like coating layers on a snack bar, frosting, chocolate, margarine, fat spread or confectionary products.

The water-insoluble components which may be incorporated into the food and beverage compositions of the present invention encompass any materials which are desirably incorporated into a food or beverage product, but which are insoluble in or immiscible with an aqueous-based composition. Such materials generally are lipophilic. Examples of such materials include certain colorants, flavorants, nutrients, nutraceuticals, therapeutic agents, antioxidants, extracts of natural components (such as plants, roots, leaves, flowers, etc.), medicaments, preservatives, and mixtures of these materials. Specific examples of such materials which are frequently used in food and beverage compositions include the following: carotenoids and their derivatives (such as beta-carotene, apocarotenal, lutein, lutein ester, lycopene, zeaxanthin, crocetin, astaxanthin), essential oils, edible oils, fatty acids, proteins and peptides, polyunsaturated fatty acids and their esters, vitamin A and its derivatives, vitamin E and its derivatives, vitamin D and its derivatives, vitamin K and its derivatives, colorants, flavorants, nutrients, nutraceuticals, therapeutic agents, antioxidants, extracts of natural components (such as plants, roots, leaves, flowers, seeds, etc.), medicaments, preservatives, lipoic acid, phytosterins, quercetin, phytosterols and their esters, co-enzyme Q10 (ubidecarone), plant isoflavones (such as genistein, isogenistein or formononetine), and mixtures thereof.

Particularly preferred materials which can be incorporated using the present invention include, for example, oil-soluble, oil-insoluble or water-soluble food ingredients, such as food additives, food preservatives, food supplements, antioxidants, nutraceuticals, cosmoceuticals, plant extracts, medicaments, fatty acids, peptides, proteins, carbohydrates, natural flavors, synthetic flavors, colorants, vitamins, and combinations of those materials. The specific microemulsion systems of beta-carotene, vitamin E, vitamin A materials, such as vitamin A palmitate, vitamin E acetate, and mixtures of those components are given as examples of this invention.

A key element for forming the microemulsions of the present invention is the ternary surfactant emulsifier system. It is through the use of this ternary system that microemulsions which provide the benefits of the present invention are formed. This ternary emulsifier system is a mixture of at least three food grade emulsifiers in the form of nonionic or anionic surfactants. Nonionic surfactants are preferred. Nonionic surfactants are well known in the art and are described, for example, in *Nonionic Surfactants: Organic Chemistry*, Nico M. van Os (ed.), Marcel Dekker, 1998. At least one of the emulsifiers has a low HLB (i.e., from about 1 to about 5), at least one of the emulsifiers has a medium HLB (i.e., from about 6 to about 8), and at least one of the emulsifiers has a high HLB (i.e., from about 9 to about 17, preferably from about 10 to about 16).

The selection of the particular surfactants used in the ternary emulsifier system depends on the HLB (hydrophilic-lipophilic balance) value of such surfactants. The surfactants are selected such that they have the HLB values described above. The HLB value, and the determination thereof, for surfactants is well known in the art and is disclosed, for example, by Milton J. Rosen in *Surfactants and Interfacial Phenomena*, J. Wiley and Sons, New York, N.Y., 1978, pages 242-245, or in the *Kirk-Othmer Encyclopedia of Chemical Technology*, 3rd edition, volume 8, 1979, at pages 910-915, both incorporated herein by reference.

The following table sets forth the HLB values for a variety of anionic and nonionic surfactants which can, as examples, be used in the ternary system of the present invention. The HLB of other non-listed surfactants can be calculated using procedures well known in the art.

|  | HLB Value* |
|---|---|
| Anionic Surfactant | |
| myristic acid | 22 |
| palmitic acid | 21 |
| stearic acid | 20 |
| oleic acid | 20 |
| monoglyceride ester of diacetyltartaric acid | 9.2 |
| digylceride ester of diacetyltartaric acid | 3.2 |
| monoglyceride ester of citric acid + and salts thereof | 27 |
| diglyceride ester of citric acid | 20 |
| monoglyceride ester of lactic acid | 21 |
| diglyceride ester of lactic acid | 14 |
| dioctyl sodium sulfosuccinate | 18 |
| monoglyceride ester of phosphoric acid | 14 |
| diglyceride ester of phosphoric acid | 8 |
| lecithin | 7 to 9 |
| hydroxylated lecithin** | 8 to 9 |
| Nonionic Surfactants | |
| polysorbates | 10 to 18 |
| sorbitan ester of myristic acid | 6.7 |
| sorbitan ester of palmitic acid | 5.7 |
| sorbitan ester of stearic acid | 4.7 |
| sorbitan ester of oleic acid | 4.7 |
| polyglycerol esters of myristic acid | 3 to 16 depending on the number of glycerol units and fatty acid side chains present therein |
| polyglycerol esters of palmitic acid | |
| polyglycerol esters of stearic acid | |
| polyglycerol esters of oleic acid | |
| monoglyceride ester of myristic acid | 4.8 |
| monoglyceride ester of palmitic acid | 4.3 |
| monoglyceride ester of stearic acid | 3.8 |
| monoglyceride ester of oleic acid | 3.1 |
| diglyceride ester of myristic acid | 2.3 |
| diglyceride ester of palmitic acid | 2.1 |
| diglyceride ester of stearic acid | 1.8 |
| diglyceride ester of oleic acid | 1.8 |
| (ethoxy)n monoglyceride of myristic acid*** | 13 to 21 |
| (ethoxy)n monoglyceride of palmitic acid*** | |
| (ethoxy)n monoglyceride of stearic acid*** | |
| (ethoxy)n monoglyceride of oleic acid*** | |
| (ethoxy)n diglyceride of myristic acid*** | 7 to 15 |
| (ethoxy)n diglyceride of palmitic acid*** | |

-continued

| | HLB Value* |
|---|---|
| (ethoxy)n diglyceride of stearic acid*** | |
| (ethoxy)n diglyceride of oleic acid*** | |
| sucrose ester of myristic acid | 18 |
| ester of palmitic acid | 17 |
| ester of stearic acid | 16 |
| ester of oleaic acid | 16 |
| propylene glycol ester of myristic acid | 4.4 |
| ester of palmitic acid | 3.9 |
| ester of stearic acid | 3.4 |
| ester of oleaic acid | 4.3 |

*in fully ionized form in water at 20–25° C.
**amphoteric depending on pH of matrix
***wherein n is a whole number from 10 to 30

Any edible oil may be used as the oil phase in the present compositions. Specifically, the oil phase can be selected from edible fat/oil sources, such as the oil extracts from natural components (e.g., plants, flowers, roots, leaves, seeds). For example, these materials can include carrot seed oil, sesame seed oil, vegetable oil, soybean oil, corn oil, canola oil, olive oil, sunflower oil, safflower oil, peanut oil, or algae oil. Also included are flavor oils, animal oils (such as fish oils), and dairy products (such as butterfat). The oil phase can be made from pure oil, mixtures of different oils, or a mixture of different oil-soluble materials, or mixtures thereof.

In the oil-in-water microemulsions of the present invention the low HLB surfactant is present at from about 0.1% to about 5%, particularly about 0.7% to about 1%, of the microemulsion. The high HLB surfactant is present at from about 5% to about 25%, particularly from about 12% to about 18%, of the microemulsion. The medium HLB surfactant is present at from about 0.1% to about 5%, particularly from about 0.5% to about 1.5% of the microemulsion. Particularly preferred low HLB surfactants include glycerol monooleate, polyglycerol riconoleate, decaglycerol decaoleate, sucrose erucate and sucrose oleate. Particularly preferred medium HLB surfactants are polyglycerol esters, such as decaglycerol hexaoleate, and triglycerol monofatty acids, such as triglycerol monooleate, and sucrose stearate. Particularly preferred high HLB surfactants include polysorbate 80 or polyoxysorbitan monolaurate (commercially available as the TWEEN® series of surfactants), polyglycerol-6 laurate, decaglycerol lauric acid esters, decaglycerol oleic acid esters and sucrose esters.

In one embodiment of the microemulsions of the present invention, the oil phase is dispersed within the aqueous phase (i.e., an oil-in-water (o/w) microemulsion). The oil phase is present in particulate form, having a particle size mean diameter of less than about 300 nm, such as from about 1 to about 300 nm, preferably from about 1 to about 200 nm. The aqueous phase typically comprises water and the water-soluble ingredients of the composition, and is present at from about 50% to about 90%, preferably from about 70% to about 85%, of the microemulsion. The oil phase generally comprises from about 1% to about 15%, preferably from about 2% to about 6%, of the microemulsion. Typically, the oil phase includes the water-insoluble components, as they have been defined above, together with the low HLB emulsifier component.

This oil-in-water microemulsion of the present invention, described above, can be formulated in a relatively simple manner as follows. The lipophilic water-insoluble components are mixed with the low HLB emulsifier to form the oil phase. Heat may be applied, if necessary, to melt the insoluble components and/or the surfactant to form the oil phase. The emulsifier system, which comprises the high HLB and the medium HLB emulsifiers is then formed and mixed into the oil phase. The aqueous phase is then added into the previously made (oil phase/emulsifier) mixture and further mixed to form the microemulsion. The mixing which is required to form the microemulsion is relatively easy mixing. Typical equipment which can be used to mix the components to form the microemulsion include, for example, a magnetic stirrer or an overhead mixer.

In selecting the emulsifiers utilized in the microemulsions of the present invention, the following criteria may also be important. The high HLB emulsifier should have an HLB value between about 9 and about 17, preferably between about 10 and about 16. Without wishing to specify a particular mechanism of action of the emulsifiers, it may be advantageous to use emulsifiers with relatively bulky head groups and non-bulky tails selected as to their length so they can form micelles readily. This is the major emulsifier which confers water-soluble characteristics to the system. The hydrophilic portions of the molecule repel each other sideways to curve the interface around the oil side and promote the formation of the oil-in-water microemulsions. The low HLB emulsifier must be lipophilic and have an HLB value between about 1 and about 5. This minor emulsifier stays within the oil phase and acts as a co-surfactant. The emulsifier molecules align their heads and tails in nearly a perfect way with the oil and the first hydrophilic surfactant to promote formation of micelles as small as possible. The third emulsifier has a medium HLB between about 6 and about 8. This minor emulsifier can stay in either the water or oil phase and also acts as a co-surfactant. It is believed that this emulsifier not only further reduces the interfacial tension between droplets, but also tends to bend the interface to make the droplets smaller. The combination of the very low interfacial tension, long hydrophobic tails of the first emulsifier and close packing, and the effect of the co-surfactants on the curvature of the interface provides a dispersed and stable system of small droplet size. Examples of food grade surfactants which can be used in the microemulsions of the present invention include polysorbates (ethoxylated sorbitan esters), such as polysorbate 80; sorbitan esters, such as sorbitan monostearate; sugar esters, such as sucrose laurate; polyglycerol esters of fatty acids (from mono-, di-, tri-, and up to deca-, glycerol esters of fatty acids), mono and diglycerides, combinations of fatty acids and ethoxylated mono-diglycerides, and mixtures thereof.

In addition to the oil-in-water microemulsions described above, the present invention also encompasses water-in-oil (w/o) microemulsions. These are particularly useful for incorporating water-soluble materials into oil- or fat-based compositions. In these water-in-oil microemulsions, the aqueous phase is dispersed in the oil phase. The aqueous phase is present in particulate form, having a particle size mean diameter of less than about 300 nm, such as from about 1 to about 300 nm, preferably from about 1 to about 200 nm. The aqueous phase typically comprises water and the water-soluble ingredients of the composition, and is present at from about 1% to about 15%, preferably from about 2% to about 6%, of the microemulsion. The oil phase includes the water-insoluble components and the oily/fatty base, and is generally present at from about 50% to about 90%, preferably from about 70% to about 85%, of the microemulsion.

In forming these water-in-oil microemulsions, the water-soluble components are mixed with the high HLB emulsifier to form the aqueous phase. The low HLB and medium HLB emulsifiers are then mixed together and added to the aqueous phase. The oil phase is then added to the aqueous phase with mixing, for example, with an overhead mixer to form the water-in-oil microemulsion. Typically, in water-in-oil microemulsions, the high HLB surfactant is present at from about 0.1% to about 5%, the medium HLB surfactant is present at from about 0.1% to about 5%, and the low HLB surfactant is present at from about 5% to about 30%, of the final composition.

Physical properties of the microemulsion composition, and the final product, can be adjusted by increasing or decreasing the amount of oil or water in the dispersed phase of the microemulsion.

Finally, the present invention encompasses concentrate microemulsion systems which comprise the dispersed phase (including the component(s) which is (are) to be incorporated into the final composition) and the three emulsifiers defined herein; the concentrate does not include the continuous phase. The concentrate is added to the continuous phase, with stirring, and the microemulsion is formed. Thus, in a concentrate to form an oil-in-water microemulsion, there will be included an oil-based phase of selected lipid-soluble ingredients, together with the ternary emulsifier system, with no aqueous phase. This concentrate is added to an aqueous phase, with mixing, to form the oil-in-water microemulsion. On the other hand, for a concentrate to form a water-in-oil microemulsion, there will be an aqueous phase of particular water-soluble ingredients, together with the ternary emulsifier system, with no oil phase. Examples of such concentrates are described in this application. These concentrates that will form oil-in-water microemulsions comprise from about 1% to about 40% of the disperse phase, and from about 1% to about 10% of the low HLB emulsifier, from about 1% to about 10% of the medium HLB emulsifier, and from about 65% to about 95% of the high HLB emulsifier. These concentrates that will form water-in-oil microemulsions comprise from about 1% to about 40% of the dispersed phase, and from about 65% to about 95% of the low HLB emulsifier, from about 1% to about 10% of the medium HLB emulsifier, and from about 1% to about 10% of the high HLB emulsifier. The concentrate is added, with mixing, to the continuous phase such that the final microemulsion composition comprises from about 1% to about 15% (preferably from about 2% to about 6%) of the dispersed phase, and from about 50% to about 99% (preferably from about 70% to about 85%) of the continuous phase.

The microemulsions of the present invention may be incorporated into aqueous-based or lipid-based food and beverage products. These products are conventional and are well known in the art. Examples and information about the formulation of such products may be found in the *Encyclopedia of Food Sciences and Nutrition*, by Benjamin Caballero, Luis C. Trugo and Paul M. Finglas (editors), 2nd Edition, London: Academic, 2003, or in the *Dictionary of Food Compounds with CD-ROM: Additives, Flavors and Ingredients*, edited by Shmuel Yannai, Boca Raton, Fla., CRC Press, 2004, or in *The Soft Drinks Companion: A Technical Handbook for the Beverage Industry*, by Maurice Shachman, Boca Raton, Fla., CRC Press, 2005, all of which are incorporated herein by reference.

The microemulsions of the present invention may be incorporated into those products using the following conventional techniques. The microemulsions can be incorporated into those products as color, flavor or other types of food ingredients. The microemulsions can simply be added and mixed or diluted directly into aqueous-based or lipid-based food and beverage compositions using typical mixers or stirrers. The speed with which the microemulsion systems are incorporated into food and beverage products depends on the velocity at which individual components in the microemulsions dissolve into the specific food and beverage systems; typically the products can be homogeneous within 5 minutes. The speed of incorporation of microemulsions into various systems could be accelerated by increasing the speed of mixing and/or possibly warming the food systems to about 40° C., if it is necessary.

In addition to the components described above, the food and beverage compositions, as well as the microemulsions of the present invention, may include adjunct components conventionally used in food or beverage products at their art-established levels. Examples of such components include preservatives, antioxidants, flavorants, colorants, nutrients, nutraceuticals, food supplements, antioxidants, plant extracts, therapeutic agents (for example, chondroitin or electrolytes), and combinations of those materials. To the extent such components are water-immiscible or lipid-immiscible, they may be incorporated into the food and beverage compositions using the microemulsions of the present invention.

By using the compositions and methods of the present invention, it is possible to form effective microemulsions without the use of co-solvents, such as ethanol and propylene glycol. These co-solvents can result in off-flavors in the food or beverage compositions. In addition, the microemulsions of the present invention are formed using lower levels of surfactants than are typically needed in microemulsion formation. Because of this, the microemulsions of the present invention exhibit less off-flavor caused by surfactants, are able to carry high levels of difficult-to-disperse ingredients, and are more stable either in concentrated or dilute form. In addition, the present invention allows for the preparation of stable compositions containing difficult-to-disperse ingredients (such as beta-carotene). Beta-carotene is highly insoluble and tends to recrystallize, hence breaking a typical microemulsion system). The present invention allows for a stable composition of such materials, such as beta-carotene, formed in a way which does not require extreme processing conditions. Further, the microemulsions of the present invention, as well as the food and beverage products containing them, have a controllable appearance in that by adjusting the types and concentrations of surfactants and/or the oil phase, the optical properties, from crystal clear to cloudy, can be adjusted in the finished product.

The following examples are intended to be illustrative of various embodiments of the present invention and are not intended to be limiting of the invention definition in any way.

Example 1—Beta-Carotene Oil-in-Water Microemulsion

The following is an example of the preparation of a beta-carotene oil-in-water microemulsion of the present invention. The microemulsion has the following composition:

| Component | Weight % |
| --- | --- |
| Water, deionized | 79.335 |
| Sodium benzoate agglomerate | 0.075 |
| Ascorbic acid | 0.20 |
| Polysorbate 80 (TWEEN ®) - high HLB | 15.00 |
| Triglyceryl monostearate - medium HLB | 1.00 |
| Beta-carotene (30% suspension in vegetable oil) | 3.36 |

-continued

| Component | Weight % |
|---|---|
| Vitamin E (tocopherol alpha) | 0.10 |
| Vitamin A palmitate | 0.10 |
| Glyceryl monooleate - low HLB | 0.83 |
| Total | 100.000 |

The above ingredients are prepared in three separate parts: (1) a water phase (water, sodium benzoate and ascorbic acid); (2) a mixture of emulsifiers containing the high and medium HLB materials (polysorbate and Triglyceryl monostearate); and (3) an oil phase which comprises the water-insoluble components and the low HLB emulsifier (beta-carotene 30%, vitamin E, vitamin A and glycerol monooleate). Heat is used to melt the beta-carotene and surfactant so that the components form a single liquid phase. These three parts are then added in the following order to form a concentrated microemulsion:

In the first vessel, prepare the aqueous phase by adding sodium benzoate to deionized water. Mix for 5 minutes with medium agitation until the powder is completely dissolved. Add ascorbic acid and mix for 5 minutes. In the second vessel, prepare the emulsifier phase by combining polysorbate 80 (TWEEN®) and polyglycerol ester (tryglyceryl monostearate). Mix well until it is homogeneous. In the heating kettle, prepare the oil phase by combining beta-carotene 30% oil, glyceryl monooleate, vitamin A palmitate and alpha tocopherol. After the oil phase is completely mixed, heat the kettle containing beta-carotene, vitamin E, vitamin A and glyceryl monooleate to 280-285° F. with medium agitation until beta-carotene crystals are completely dissolved. Immediately add the oil phase from the kettle to the emulsifier phase in the second vessel, then mix for an additional 5 minutes or until homogeneous. Then add the aqueous phase (water/sodium benzoate/ascorbic acid) from the first vessel to the mixture of the oil phase and emulsifier in the second vessel. Mix at high speed for 15 minutes or until the microemulsion is uniform. The microemulsion can then be diluted to the desired concentration and added to a food or beverage product.

Examples of commercial sources of emulsifiers suitable for use in the present invention, include, but are not limited to, Abitec ADM, BASF, Danisco, ICI, Lambent Technologies, Lonza, Mitsubishi Chemical, and Stepan.

Example 2—Lemon Oil-in-Water Microemulsion

| Component | Weight % |
|---|---|
| Water, deionized | 77.225 |
| Sodium benzoate agglomerate | 0.075 |
| Ascorbic acid | 0.20 |
| Decaglycerol lauric acid ester - high HLB | 16.67 |
| Decaglycerol oleic acid ester - medium HLB | 1.67 |
| Lemon oil | 3.33 |
| Sucrose oleate - low HLB | 0.83 |
| Total | 100.00 |

First, mix 16.67 g of decaglycerol lauric acid ester with 1.67 g of decaglycerol oleic acid ester. Second, mix 3.33 g of lemon oil with 0.83 g of sucrose oleate in a separate container, then add to the mixture obtained above. Third, mix sodium benzoate with deionized water before adding ascorbic acid. Then add the aqueous phase to the mixture from step two. Microemulsion is obtained by mixing, using an overhead mixer. The entire process is done at room temperature. This system can be diluted with any amount of water.

Example 3—Paprika Oil-in-Water Microemulsion

| Component | Weight % |
|---|---|
| Water, deionized | 71.00 |
| Sodium benzoate agglomerate | 0.075 |
| Ascorbic acid | 0.20 |
| Decaglycerol lauric acid ester - high HLB | 25.00 |
| Decaglycerol tetraoleate - medium HLB | 1.67 |
| Paprika oleoresin | 1.00 |
| Decaglycerol decaoleate - low HLB | 1.00 |
| Total | 100.00 |

First, mix 25 g of decaglycerol lauric acid ester with 1.67 g of decaglycerol tetraoleate. Second, mix 1 g of paprika oleoresin with 1 g of decaglycerol decaoleate in a separate container, then add to the mixture obtained above. Third, mix sodium benzoate with deionized water before adding ascorbic acid. Then add the aqueous phase to the mixture from step two. Microemulsion is obtained by mixing, using an overhead mixer. The entire process is done at room temperature. This system can be diluted with any amount of water.

Example 4—Beet Juice Water-in-Oil Microemulsion

| Component | Weight % |
|---|---|
| Cottonseed oil | 74.64 |
| Polysorbate 80 - high HLB | 1.49 |
| Triglycerol monooleate - medium HLB | 1.49 |
| Beet juice | 7.46 |
| Polyglycerol ricinoleate - low HLB | 14.92 |
| Total | 100.00 |

First, mix 7.46 g of beet juice and 1.49 g of polysorbate 80. Second, mix 1.49 g of triglycerol monooleate with 14.92 g of polyglycerol ricinoleate in a separate container, then add to the mixture obtained above. Third, cottonseed oil is added to the mixture from step two. Concentrate beet juice water-in-oil microemulsion system is obtained by mixing, using an overhead mixer. The entire process is done at room temperature. This system can be diluted with any amount of edible vegetable or mineral oil or lipid-based systems provided the system does not contain substantial levels of emulsifier (s).

Example 5—Aronia Extract Water-in-Oil Microemulsion

| Component | Weight % |
|---|---|
| Canola oil | 70.17 |
| Decaglycerol monocaprylate - high HLB | 1.75 |
| Decaglycerol tetraoleate - medium HLB | 1.75 |

| Component | Weight % |
| --- | --- |
| Aronia extract | 8.77 |
| Polyglycerol ricinoleate - low HLB | 17.54 |
| Total | 100.00 |

First, mix 8.77 g of aronia extract (natural water-soluble colorants) and 1.75 g of decaglycerol monocaprylate. Second, mix 1.75 g of decaglycerol tetraoleate with 17.54 g of polyglycerol ricinoleate in a separate container, then add to the mixture obtained above. Third, canola oil is added to the mixture from step two. Concentrate aronia extract water-in-oil microemulsion system is obtained by mixing, using an overhead mixer. The entire process is done at room temperature. This system can be diluted with any amount of edible vegetable or mineral oil or lipid-based systems provided the system does not contain substantial levels of emulsifier (s).

Example 6—Elderberry Extract Water-in-Oil Microemulsion Concentrate

| Component | Weight % |
| --- | --- |
| Polyethyleneglycol monooleate - high HLB | 5.89 |
| Decaglycerol hexaoleate - medium HLB | 5.89 |
| Elderberry extract | 29.41 |
| Decaglycerol decaoleate - low HLB | 58.82 |
| Total | 100.00 |

First, mix 29.41 g of elderberry extract (natural water-soluble colorants) and 5.89 g of polyethyleneglycol monooleate. Second, mix 58.82 g of decaglycerol tetraoleate with 5.89 g of decaglycerol hexaoleate in a separate container, then add to the mixture obtained above to form the concentrate. Canola oil is added to the mixture from step two to form the microemulsion by mixing using an overhead mixer. The entire process is done at room temperature. This system can be diluted with any amount of edible vegetable or mineral oil or lipid-based systems provided the system does not contain substantial levels of emulsifier (s).

Example 7—Alpha-Tocopherol Oil-in-Water Microemulsion Concentrate

| Component | Weight % |
| --- | --- |
| Polysorbate 20 (TWEEN ®) - high HLB | 85.00 |
| Triglycerol monooleate - medium HLB | 5.00 |
| Alpha-tocopherol | 6.67 |
| Decaglycerol decaoleate - low HLB | 3.33 |
| Total | 100.00 |

First, mix 6.67 g of alpha-tocopherol (vitamin E) and 3.33 g of decaglycerol decaoleate. Second, mix 5 g of triglycerol monooleate with 85 g of polysorbate 20 in a separate container, then add to the mixture obtained above. Concentrate alpha-tocopherol microemulsion (micellar) system is obtained by mixing, using an overhead mixer. The entire process is done at room temperature. This system can be diluted with any amount of water.

Example 8—Vitamin E Acetate Oil-in-Water Microemulsion Concentrate

| Component | Weight % |
| --- | --- |
| Decaglycerol lauric acid ester - high HLB | 89.26 |
| Decaglycerol tetraoleate - medium HLB | 1.65 |
| Vitamin E acetate | 7.44 |
| Glyceryl monooleate - low HLB | 1.65 |
| Total | 100.00 |

First, mix 7.44 g of vitamin E acetate and 1.65 g of glyceryl monooleate. Second, mix 1.65 g of decaglycerol tetraoleate with 89.26 g of decaglycerol lauric acid ester in a separate container, then add to the mixture obtained above. Concentrate vitamin E acetate microemulsion (micellar) system is obtained by mixing, using an overhead mixer. The entire process is done at room temperature. This system can be diluted with any amount of water.

Example 9—Beverage with Vitamin E Microemulsion

| Component | Weight % |
| --- | --- |
| Water | 86.67 |
| Sucrose | 6.00 |
| Citric acid | 1.00 |
| Ascorbic acid | 0.30 |
| Apple juice | 5.00 |
| Pineapple juice | 1.00 |
| Vitamin E microemulsion (e.g., see Example 8) | 0.03 |
| Total | 100.00 |

First, mix 6 g of sucrose, 1 g of citric acid and 0.3 g of ascorbic acid with 86.67 g of water. Second, add 5 g of apple juice, 1 g of pineapple juice and 0.3 g vitamin E microemulsion into the solution of step one, and mix until homogeneous using a stirrer or an overhead mixer. The entire process is done at room temperature. This system can then be passed through a thermal process, such as pasteurization or sterilization, to prevent microbial spoilage.

Example 10—Beverage with Beta-Carotene Microemulsion

| Component | Weight % |
| --- | --- |
| Water | 86.44 |
| Sucrose | 12.00 |
| Citric acid | 1.30 |
| Ascorbic acid | 0.20 |
| Orange flavor | 0.05 |
| Beta-carotene microemulsion (e.g., see Example 1) | 0.01 |
| Total | 100.00 |

First, mix 12 g of sucrose, 1.03 g of citric acid and 0.2 g of ascorbic acid with 86.44 g of water. Second, add 0.05 g of orange flavor and 0.01 g of beta-carotene emulsion into the solution formed in step one, and mix until homogeneous using a stirrer or an overhead mixer. The entire process is done at room temperature. This system can then be passed through a thermal process, such as pasteurization or sterilization, to prevent microbial spoilage.

Example 11—Icing with Aronia Extract Natural Color Microemulsion

| Component | Weight % |
|---|---|
| Confectioners sugar | 77.88 |
| Canola oil | 11.88 |
| Water | 9.11 |
| Cream of tartar | 0.77 |
| Salt | 0.45 |
| Aronia extract microemulsion (e.g., see Example 5) | 0.17 |
| Total | 100.00 |

First, mix 77.8 g of confectioners sugar, 0.77 g of cream of tartar and 0.45 g of salt with 9.11 g of water and 11.88 g of canola oil. Then add aronia extract microemulsion to the mixture formed in step one. Mix thoroughly until homogeneous. The entire process is done at room temperature.

While this invention has been described with reference to certain specific embodiments, it will be recognized by those skilled in the art that many variations are possible without departing from the scope and spirit of the invention. Further, it will be understood that the present application is intended to cover all changes and modifications of the invention disclosed herein for the purposes of illustration which do not constitute departure from the spirit and scope of the invention.

What is claimed is:

1. A composition used to incorporate lipophilic water-insoluble materials into food and beverage products, consisting essentially of:
   (a) an oil phase comprising said water-insoluble material and a low HLB nonionic emulsifier having an HLB of from about 1 to about 5 selected from glycerol esters of fatty acids, monoglycerides, diglycerides, ethoxylated monoglycerides, polyglycerol esters of fatty acids, sorbitan esters of fatty acids, sucrose esters of fatty acids, and mixtures thereof;
   (b) an aqueous phase; and
   (c) a food grade emulsifier system consisting of:
      (i) a high HLB nonionic emulsifier having an HLB of from about 9 to about 17 selected from acetic acid esters of mono and diglycerides, lactic acid esters of mono and diglycerides, succinic acid esters of mono and diglycerides, diacetyl tartaric esters of mono and diglycerides, polyoxyethylenesorbitan esters, polyglycerol esters of fatty acids, sucrose esters of fatty acids, and mixtures thereof; and
      (ii) a medium HLB nonionic emulsifier having an HLB of from about 6 to about 8 selected from monoglycerides, diglycerides, ethoxylated monoglycerides, sorbitan esters of fatty acids, phosphoric acid esters of mono and di-glycerides, polyglycerol esters of fatty acids, sucrose esters of fatty acids, and mixtures thereof;
   wherein said oil phase is dispersed as particles having an average diameter of from about 1 to about 300 nm, within said aqueous phase; wherein said composition is a microemulsion, is transparent, thermodynamically stable, and has a low interfacial tension; and wherein said low, medium and high HLB emulsifiers act to form the microemulsion.

2. The composition according to claim 1 which comprises aqueous phase at from about 50% to about 90% of the total, the balance being oil phase and food grade emulsifier system, of which the oil phase comprises from about 1% to about 15% of the total.

3. The composition according to claim 2 wherein the emulsifier defined as components (c)(i) has an HLB of from about 10 to about 16.

4. The composition according to claim 3 which comprises from about 0.1% to about 5% of the low HLB nonionic emulsifier, from about 5% to about 25% of the high HLB nonionic emulsifier, and from about 0.1% to about 5% of the medium HLB nonionic emulsifier.

5. The composition according to claim 1 wherein the aqueous phase contains dissolved materials selected from colorants, vitamins, juices, antioxidants, extracts of natural components, medicaments, simple phenols, polyphenols, bioflavonoids, dairy products, proteins, peptides, salts, sugars, sweeteners, flavors, flavor precursors, nutrients, minerals, acids and seasonings, and mixtures thereof.

6. The composition according to claim 1 wherein the low HLB nonionic emulsifier is selected from glycerol monooleate, polyglycerol ricinoleate, decaglycerol decaoleate, sucrose erucate, sucrose oleate, and mixtures thereof.

7. The composition according to claim 1 wherein the medium HLB nonionic emulsifier is selected from decaglycerol hexaoleate, triglycerol monooleate, sucrose stearate, and mixtures thereof.

8. The composition according to claim 1 wherein the high HLB nonionic emulsifier is selected from polysorbate 80, polyoxyethylenesorbitan monolaurate, polyglycerol-6-laurate, decaglycerol lauric acid esters, decaglycerol oleic acid esters and mixtures thereof.

9. The composition according to claim 1 wherein the water-insoluble material is selected from carotinoids and their derivatives, essential oils, edible oils, fatty acids, proteins and peptides, polyunsaturated fatty acids and their esters, vitamin A and its derivatives, vitamin E and its derivatives, vitamin D and its derivatives, vitamin K and its derivatives, colorants, flavorants, nutrients, nutraceuticals, therapeutic agents, antioxidants, extracts of natural components, medicaments, preservatives, lipoic acid, phytosterins, quercetin, phytosterols and their esters, co-enzyme Q10 (ubidecarone), plant isoflavones, and mixtures thereof.

10. The composition according to claim 9 wherein the water-insoluble material is selected from beta-carotene, apocarotenal, vitamin E, vitamin A, vitamin A palmitate, vitamin E acetate, and mixtures thereof.

11. The composition according to claim 1 wherein the oil phase is dispersed as particles having an average diameter of from about 1 to about 200 nm within said aqueous phase.

12. The composition according to claim 1 which comprises from about 70% to about 85% of the aqueous phase and from about 2% to about 6% of the oil phase.

13. The composition according to claim 1 wherein the emulsifiers used in the microemulsion comprise glycerol monooleate, polysorbate 80, and polyglycerol esters.

14. A food composition incorporating one or more lipophilic water-insoluble materials and the microemulsion of claim 1 in an amount effective to suspend said lipophilic water-insoluble materials in said food composition.

15. A beverage composition incorporating one or more lipophilic water-insoluble materials and the microemulsion of claim 1 in an amount effective to suspend said lipophilic water-insoluble materials in said beverage composition.

16. A method for preparing the microemulsion of claim 1, comprising the steps of:
   (a) mixing the lipophilic water-insoluble components with the low HLB nonionic emulsifier to form the oil phase;
   (b) mixing the emulsifier system into the oil phase; and
   (c) adding the aqueous phase into the product of step (b) and mixing to form the microemulsion.

17. A concentrate used to form an oil-in-water microemulsion for use in food or beverage products, according to claim 1 by the addition of water to said concentrate, consisting essentially of:
   (a) from about 1% to about 40% of a dispersed oil phase containing a lipophilic component to be incorporated into said food or beverage composition;
   (b) from about 1% to about 10% of a food grade low HLB nonionic emulsifier having an HLB of from about 1 to about 5 selected from glycerol esters of fatty acids, monoglycerides, diglycerides, ethoxylated monoglycerides, polyglycerol esters of fatty acids, sorbitan esters of fatty acids, sucrose esters of fatty acids, and mixtures thereof;
   (c) from about 1% to about 10% of a food grade medium HLB nonionic emulsifier having an HLB of from about 6 to about 8 selected from monoglycerides, diglycerides, ethoxylated monoglycerides, sorbitan esters of fatty acids, phosphoric acid esters of mono and diglycerides, polyglycerol esters of fatty acids, sucrose esters of fatty acids, and mixtures thereof; and
   (d) from about 65% to about 95% of a food grade high HLB nonionic emulsifier having an HLB of from about 9 to about 17 selected from acetic acid esters of mono and diglycerides, lactic acid esters of mono and diglycerides, succinic acid esters of mono and diglycerides, diacetyl tartaric esters of mono and diglycerides, polyoxyethylenesorbitan esters, polyglycerol esters of fatty acids, sucrose esters of fatty acids, and mixtures thereof; wherein said low, medium and high HLB emulsifiers act to form the microemulsion formed.

18. A food composition incorporating one or more lipophilic water-insoluble materials, and the concentrate of claim 17 in an amount effective to suspend said lipophilic water-insoluble materials in said food composition.

19. A beverage composition incorporating one or more lipophilic water-insoluble materials, and the concentrate of claim 17 in an amount effective to suspend said lipophilic water-insoluble materials in said beverage composition.

20. A method for preparing the concentrate of claim 17, comprising the steps of:
   (a) mixing the lipophilic water-insoluble components with the low HLB nonionic emulsifier to form the oil phase, and
   (b) mixing component (a) with the remainder of the emulsifiers.

* * * * *